Sept. 27, 1966   G. R. SOMMER   3,275,448
COMESTIBLES CONTAINER WITH WATER SOLUBLE PRODUCT THEREIN
Filed Aug. 26, 1963
FIG. 1
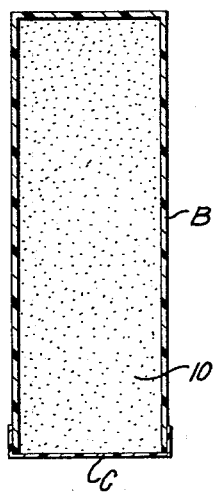
FIG. 3
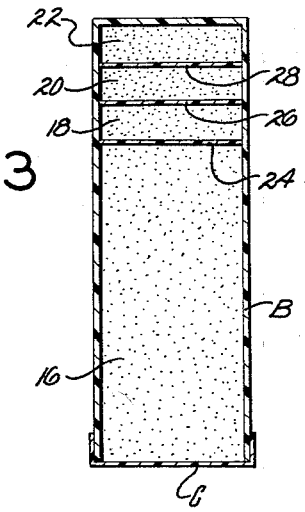
FIG 2
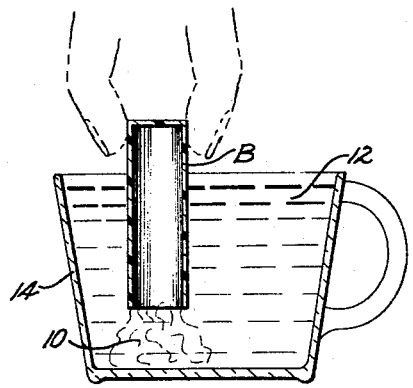
FIG. 4
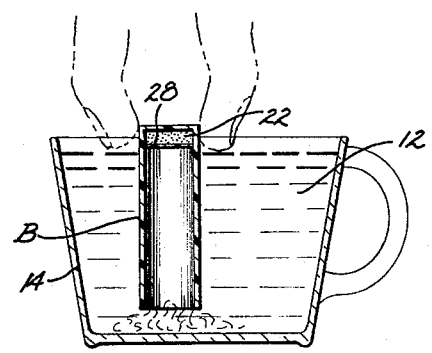
FIG. 6
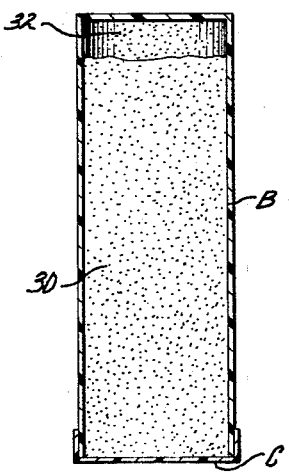
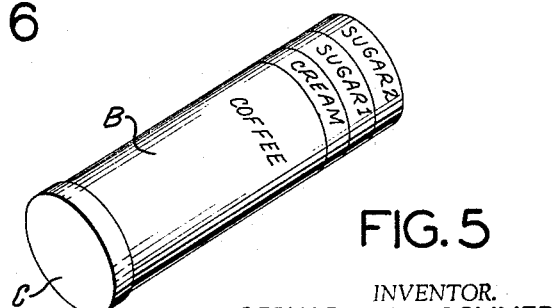
FIG. 5
INVENTOR.
GERHART R. SOMMER
BY FULWIDER, PATTON,
RIEBER, LEE & UTECHT
ATTORNEYS

United States Patent Office 3,275,448
Patented Sept. 27, 1966

3,275,448
COMESTIBLES CONTAINER WITH WATER
SOLUBLE PRODUCT THEREIN
Gerhart R. Sommer, Los Angeles, Calif., assignor of one-half to Marshall H. Sevin, Beverly Hills, Calif.
Filed Aug. 26, 1963, Ser. No. 304,481
3 Claims. (Cl. 99—77.1)

The present invention relates generally to the field of foods and more particularly to a new and novel container for comestibles intended to be mixed with water.

There are presently being marketed many comestibles that are adapted to be mixed with either hot or cold water so as to provide a beverage or food. By way of example, so-called "instant coffee" and "instant tea" finds wide use. Generally, the instant coffee or instant tea is merchandised in bottles, the coffee or tea taking the form of a fine powder. To prepare the coffee or tea beverage, the powder is removed from the container and dumped into a cup of hot or cold water. It is then necessary to thoroughly intermix the coffee or tea particles with the water by stirring with a spoon or other stirring means. This is a time consuming and annoying task, particularly since the coffee or tea powders tend to float upon the surface of the water. Moreover, it is often times difficult to locate a spoon or other mixing utensil.

It is a major object of the present invention to provide a container for comestibles that is to be mixed with water, such container serving not only to house a comestible until it is deposited into the water, but said container thereafter serving as a stirring means for thoroughly intermixing the comestible and the water.

Another object of the present invention is to provide a container of the aforedescribed nature that includes a hollow comestible-receiving body of nonwater soluble material having an open lower end, said open lower end being normally sealed by means of a water-soluble cover, with the dissolution of said cover releasing the contents of said body into the water whereafter the upper portion of the body may be grasped by the user to serve as a stirring means.

Another object of the present invention is to provide a comestibles container of the aforedescribed nature adapted to hold either a single comestible or a plurality thereof.

An additional object of the present invention is to provide a comestibles container of the aforedescribed nature wherein the body is normally pressurized at superatmospheric pressure by means of a suitable gas, with the escape of such gas when the seal is dissolved expediting the removal of the comestible from within the body.

Yet another object of the present invention is to provide a comestible container of the aforedescribed nature which is economical of manufacture.

These and other objects and advantages of the present invention will become apparent from the following detailed description when taken in conjunction with the appended drawings wherein:

FIGURE 1 is a central vertical sectional view showing a first form of comestibles container embodying the present invention;

FIGURE 2 is a diagrammatic view showing the manner of use of the container of FIGURE 1;

FIGURE 3 is a central vertical sectional view of a second form of comestibles container embodying the present invention;

FIGURE 4 is a central vertical sectional view showing the use of the comestibles container of FIGURE 3;

FIGURE 5 is a perspective view of said second form of comestible container; and

FIGURE 6 is a central vertical sectional view of a third form of comestibles container embodying the present invention.

Referring to the drawings and particularly FIGURE 1 thereof, the first form of comestibles container embodying the present invention includes a hollow, generally tubular, integral body B having its upper end closed and its lower end open. The body B may be formed of any suitable non-water soluble, chemically inert material, as for example a synthetic plastic, treated paperboard or glass. A cover C is provided for the open lower end of the body B. The cover C is formed of a water-soluble material, as for example a suitable gelatin compound. The cover C serves to normally seal a comestible 10 within the body B. Such comestible may take various forms, as for example instant coffee, instant tea, bouillon, or the like.

Referring now to FIGURE 2, in use, the lower end of the body B is positioned below the surface of a body of water 12 contained in a cup, dish or the like 14. Within a short time the cover C will be dissolved by the water 12 and the comestible 10 will drop into the water 12. Thereafter, the upper portion of the body B may be grasped by the user so as to effect stirring of the comestible 14 into the water 12. This arrangement completely eliminates the need of providing a separate stirring device for intermixing the comestible 10 with the water 12.

It should also be noted that the aforedescribed comestible container makes it possible to deposit the comestible within the lower portion of the water 12. This facilitates the intermixing of the comestible with the water, since comestibles such as instant coffee tend to remain floating on the surface of water when deposited thereon, as by means of a spoon.

Referring now to FIGURE 3, there is shown a second comestibles container embodying the present invention. This container includes a body B and a cover C similar to those described hereinbefore in connection with FIGURE 1. The body B of this embodiment, however, is filled at its lower portion with a comestible 16 such as instant coffee. Thereabove is disposed a quantity of a comestible 18, such as powdered milk or cream. Above the powdered milk or cream is a quantity of a comestible 20, such as sugar. Above the comestible 20 is disposed a similar comestible 22, such as an additional quantity of sugar.

The coffee 16 is separated from the cream 18 by a thin layer of gelatin 24. The upper surface of the cream is separated from the first quantity of sugar 20 by a second layer of gelatin 26. The upper surface of the first quantity of sugar 20 is in turn separated from the lower surface of the second portion of sugar 22 by a layer of gelatin 28.

Referring now to FIGURE 4, the second form of comestibles container shown in FIGURE 3 may be used with a cup 14 containing a body of water 12. Assuming that the user prefers his coffee black he will lower the body B below the surface of the water 12 only to the extent that the cover C is exposed to the water, but not to the extent that the gelatin layer 24 is exposed to the water. Thus, when the cover C dissolves, the coffee 16 will be dumped into the water while the cream 18 and bodies of sugar 20 and 22 are retained within the body B. If, on the other hand, the user prefers his coffee to be mixed with the cream 18 and the first quantity of sugar 20, he will lower the container B within the water 12 to the extent that not only the cover C but also the gelatin layers 24 and 26 are dissolved, as indicated in FIGURE 4. With this procedure, the coffee 16, cream 18 and first quantity of sugar 20 will be dumped into the water while the remaining quantity of sugar 22 will be retained within the body B by the gelatin layer 28. It will be apparent that if the user prefers his coffee sweeter, the container will be lowered further until the upper gelatin layer 28 is likewise dissolved.

Referring to FIGURE 5, there is shown a perspective view of the comestibles container of FIGURES 3 and 4. As indicated in this figure, it will be convenient to provide the exterior of the body B with indicia describing the contents thereof.

Referring now to FIGURE 6, there is shown a third form of comestibles container embodying the present invention. This form of container includes a body B and a cover C similar to those described hereinbefore. A desired comestible or mixture of comestibles 30 is contained within the body B. The upper portion of the body B is provided with a space wherein is disposed a pressurized gas 32, as for example, air at superatmospheric pressure. This pressurized gas will be forced into the upper portion of the body B in a suitable manner after the comestible 30 has been deposited therein and the cover C affixed over the lower end thereof. Thus, a hollow needle may be inserted through the upper portion of the body B for injecting the pressurized gas whereafter the needle will be withdrawn and the hole formed thereby sealed. It will be apparent that the presence of the pressurized gas 32 will assist in discharging the comestible 30 from within the body B when the cover C is dissolved.

Various modifications and changes may be made with respect to the foregoing detailed description without departing from the spirit of the present invention or the scope of the following claims.

I claim:
1. A container for water-soluble comestibles comprising:
   a hollow non-water soluble body having an open lower end, said body receiving said comestible;
   a first comestible disposed within said body between the lower end thereof and the intermediate portion thereof;
   a second comestible disposed within said body above said first comestible;
   a water-soluble element interposed between said first and second comestibles to normally retain said second comestible in place within said body;
   and a water-soluble cover on the lower end of said body to normally retain said comestibles within said body, said cover dissolving when the lower end of said body is placed in water whereafter the upper portion of said body may be grasped and said body may be used as a stirring means.

2. A container for water-soluble comestibles, comprising: a hollow non-water soluble body having an open lower end, said body receiving said comestible; and water-soluble cover means normally sealing said comestible within said body, said cover means opening when said open end is placed in water whereafter the upper portion of said body may be grasped and said body used as a stirring means, with the interior of said body containing a pressurized gas that assists in forcing said comestible out of said open end when said cover means opens.

3. A container for water-soluble comestibles, comprising: a generally tubular, hollow non-water soluble body that is closed except for an open lower end, said body receiving a comestible; and a water-soluble cover on the lower end of said body that normally retains said comestible within said body, said cover means dissolving when the lower end of said body is placed in water whereby said comestible will drop into said water, with said tube being of sufficient length that its upper portion will extend above the surface of said water and said body may serve as a stirring means, with the upper interior portion of said body containing pressurized gas to assist in forcing said comestible out of the lower end of said body when such cover dissolves.

References Cited by the Examiner

UNITED STATES PATENTS

| 325,711 | 9/1885 | Stuckes | 99—77.1 |
| 790,626 | 5/1905 | French | 99—77.1 |
| 1,489,806 | 4/1924 | Anderson | 99—77.1 |
| 1,576,735 | 3/1926 | Fessenden | 99—77.1 |
| 1,931,765 | 10/1933 | Leever | 99—77.1 |
| 2,330,884 | 10/1943 | Harriman | 99—77.1 |
| 2,926,088 | 2/1960 | Spiselman | 99—77.1 |
| 3,102,465 | 9/1963 | Montesano. | |

A. LOUIS MONACELL, *Primary Examiner.*

RAYMOND N. JONES, *Assistant Examiner.*